July 9, 1963 V. DEVÈ ETAL 3,097,003
HYDRAULIC TIGHTENING DEVICE
Filed April 16, 1962
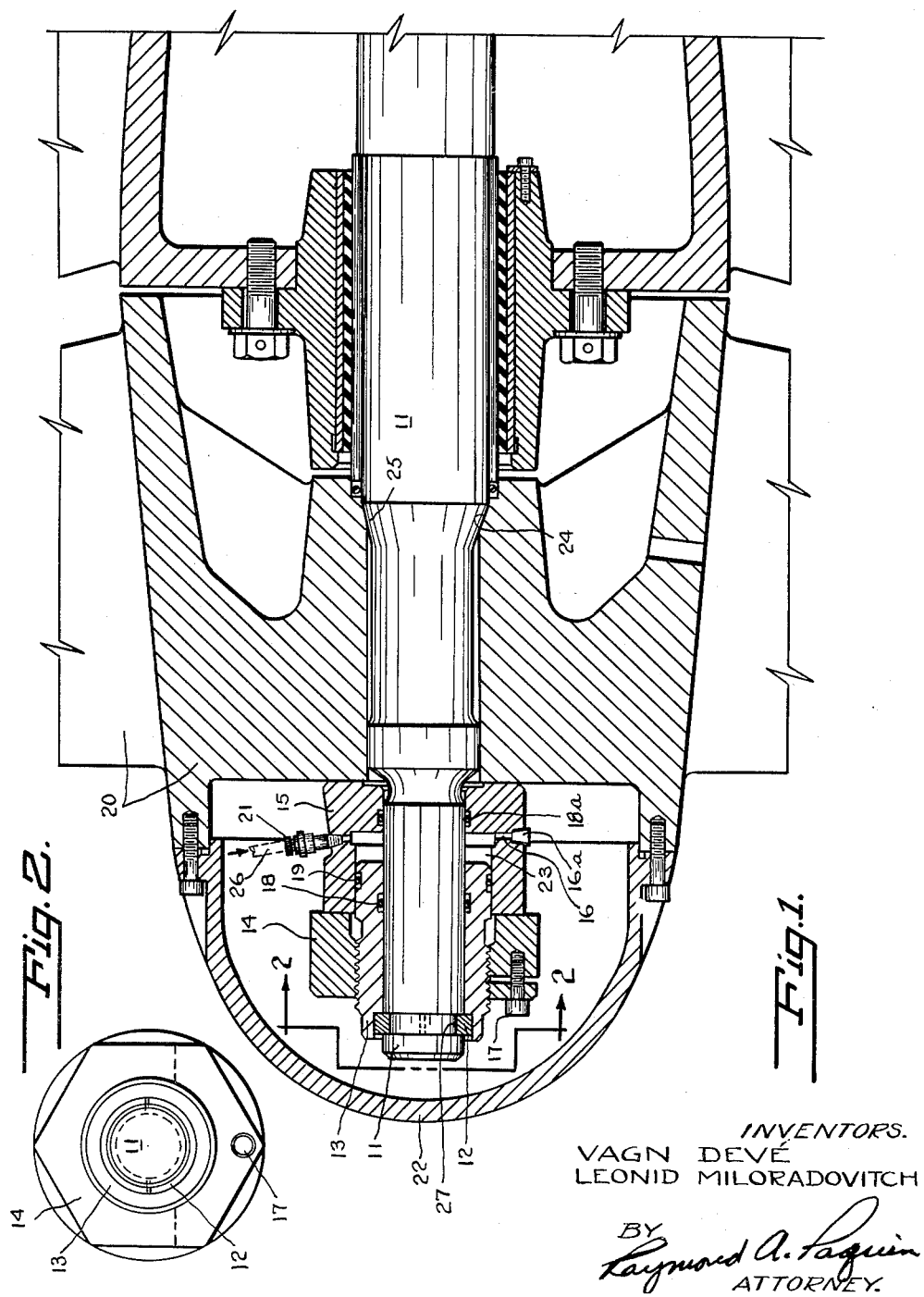
INVENTORS.
VAGN DEVÉ
LEONID MILORADOVITCH
BY
ATTORNEY.

United States Patent Office 3,097,003
Patented July 9, 1963

3,097,003
HYDRAULIC TIGHTENING DEVICE
Vagn Devé, Chomedey, Quebec, and Leonid Miloradovitch, Montreal, Quebec, Canada, assignors to Dominion Engineering Works Limited
Filed Apr. 16, 1962, Ser. No. 187,858
2 Claims. (Cl. 287—53)

This invention relates to new and useful improvements in hydraulic tightening devices and has particular reference to new and improved means for urging a member and shaft or bolt into loaded engagement of a prescribed stress and to facilitate disassembly thereof.

The object of the invention is to provide a new and improved hydraulic tightening device which may be employed for urging a member and shaft or bolt into or out of loaded engagement.

Another object of the invention is to provide a new and improved device of the type set forth which is relatively simple and compact in construction and operation, yet efficient and precise in operation.

Another object is to provide such a device which is not limited to a narrow range of bolt or shaft diameters and is particularly advantageous for large bolt or shaft diameters where the use of wrenches and levers is not practical due to weight and space limitations.

Another object is to provide a new and improved device of the type set forth wherein the stress exerted is controlled by fluid pressure thereby making it possible to obtain the required stress in a simple and precise manner.

Other objects and advantages of the invention will be apparent from the following description taken in connection with the accompanying drawing in which the preferred form of the invention has been given by way of illustration only.

Contemporary methods employed for the purposes of the present invention are as follows:

(a) *The use of torque wrenches.*—This is not satisfactory because of the uncertainty concerning the amount of torque used for overcoming the friction of the threads and thrust faces and the amount of torque remaining to effect tightening of the bolt which uncertainty results from ignorance of the actual friction coefficients at the threads, and thrust faces. Also for large bolt diameters the weight, cost and size of torque wrenches are impractical and intolerable.

(b) *The use of levers to tighten the bolts and devices to measure the bolt elongations after tightening.*—While this is not subject to the disadvantages resulting from ignorance of friction coefficients it has the disadvantages that the lever length and power required for large torques require excessive space. Also, the devices necessary for measurement of bolt elongations are sensitive and require careful handling.

(c) *The use of hydraulic devices to tension the bolts and allow a practically friction-free setting of the nut.*—This requires devices of intolerable weight and cost where large sizes are required. Also, this increased weight makes overhead adjustments extremely impractical, such as, for example, the tightening of an impeller on a vertical hydraulic machine.

(d) *The use of hydraulic nuts, which are analogous to threaded jacks, and which exert high forces under hydraulic pressure.*—With these devices there is complete loss of tension if a hydraulic leak occurs.

(e) *Thermal expansion of the bolt and then setting the nut.*—This method requires heating equipment and is generally only practical under limited conditions.

From the foregoing it will be seen that none of the contemporary methods satisfactorily accomplish the results obtained with the present invention.

Referring to the drawing:

FIG. 1 is a longitudinal sectional view through a vertical axial flow pump embodying the invention; and FIG. 2 is a view taken on line 2—2 of FIG. 1 looking in the direction of the arrows.

Referring more particularly to the drawing wherein similar reference characters designate corresponding parts throughout and in which the invention has been shown, by way of example only, as applied to a vertical axial flow pump, the arrangement shown comprises a keyless connection of the impeller hub 20 to shaft 11 whereby the transmission of torque is effected solely by friction between the conical hub bore 24 and taper 25 on shaft 11. Such a connection necessitates accurate application of a pre-calculated contact stress.

In the arrangement shown, impeller 20 is mounted on shaft 11, followed by cylinder 15. The sleeve piston 13 is slid over shaft 11 and pushed against the end of cylinder 15. The split ring 12 is assembled in the shaft groove 27 and sleeve piston 13 is pulled back over split ring 12, thereby trapping the ring halves in the shaft groove 27. The nut 14 is screwed on sleeve 13 until the portion of shaft 11 between split ring 12 and taper 25 is in tension.

The space 23 in cylinder 15 is sealed by O-rings 18, 18a and 19 and such space 23 is filled with a fluid from a suitable source through a hydraulic line 26 and inlet 21 after withdrawing vent-plug 16a from vent 16, through which air in space 23 may escape.

After vent-plug 16a is replaced pressure is applied to the fluid, the system then works as a hydraulic jack and cylinder 15 and piston 13 urge impeller 20 and shaft 11 respectively into locking engagement.

As the area of sleeve piston 13 is known, the thrust exerted on split ring 12 is exactly controlled by the pressure applied to the fluid in space 23. The length of shaft 11 between the tapered contact area 25 and split ring 12 is subjected to high tension resulting in its elongation, so that the nut 14 can be run down without effort.

Cover 22 is provided for protection of the operative mechanism.

With the method of this invention, the final stress in shaft 11 is fully controlled by the pressure applied to the fluid in space 23 and provides a dependable friction connection between impeller-hub 20 and shaft 11.

When the required stress is obtained, nut 14 is set firmly and the fluid pressure is released. The full load is then taken over by nut 14.

For safety purposes, nut 14 is locked by capscrew 17.

It will be noted that in the form of the invention shown in the drawing, the tightening device is an integral part of the hub-shaft connection system and is conveniently accessible for dismantling and reassembly. Also, nut 14 may be retightened to provide precisely the same contact stress after each removal.

It is also pointed out that there is complete accessibility of the nut which allows firm seating in an unloaded condition.

From the foregoing it will be seen that we have provided new and improved means for obtaining all of the objects and advantages of the invention.

We claim:

1. In a device of the character described, a shaft, a member having a bore with said shaft extending through said bore, said shaft and member having opposed congruent surfaces, said first means for urging said surfaces into abutting engagement, said first means comprising a hollow cylinder slidable on said shaft, a piston mounted on said shaft and slidable in said cylinder and second means for transmitting axial thrust from said piston to said shaft in one direction, said second means comprising a circumferential groove in said shaft, a face on said piston and key means in said groove, and means whereby fluid may be supplied under pressure to said cylinder and said piston to effect urging of said member into axially loaded relation with said shaft and thereby urge said surfaces into abutting engagement, and means for maintaining said member and said shaft in said axially loaded relation after removal of pressure from said fluid, and a vent plug to facilitate expulsion of air from said cylinder.

2. In a device of the character described, a shaft, a member having a bore with said shaft extending through said bore, said shaft and member having opposed congruent surfaces, and first means for urging said surfaces into abutting engagement, said first means comprising a hollow cylinder slidable on said shaft, a piston mounted on said shaft and slidable in said cylinder and second means for transmitting axial thrust from said piston to said shaft whereby said shaft is subjected to tensile stress, said second means comprising a circumferential groove in said shaft adjacent the free end of said shaft, a face on said piston, arcuate key means in said groove and engaging said face, and means whereby fluid pressure may be applied to the inside of said cylinder and to said piston to effect urging of said member into axially loaded relation with said shaft and thereby urge said surfaces into abutting engagement, and means for maintaining said member and said shaft in said axially loaded relation after removal of said fluid pressure, and a vent plug to facilitate expulsion of air from said cylinder.

References Cited in the file of this patent
UNITED STATES PATENTS

| | | |
|---|---|---|
| 861,143 | Scott | July 23, 1907 |
| 2,210,811 | Kelpsch | Aug. 6, 1940 |
| 2,571,265 | Leufven | Oct. 16, 1951 |
| 2,959,258 | Hagemann | Nov. 8, 1960 |
| 3,033,597 | Miller | May 8, 1962 |